W. E. WILLIAMS.
PRESSED PLATE WHEEL.
APPLICATION FILED NOV. 10, 1919.
1,378,300.
Patented May 17, 1921.
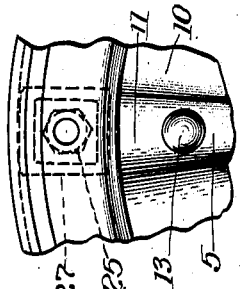
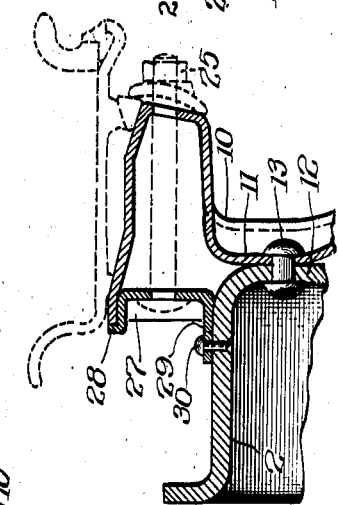
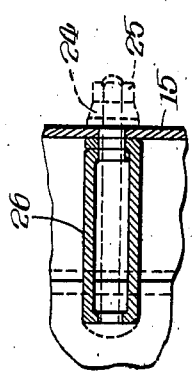
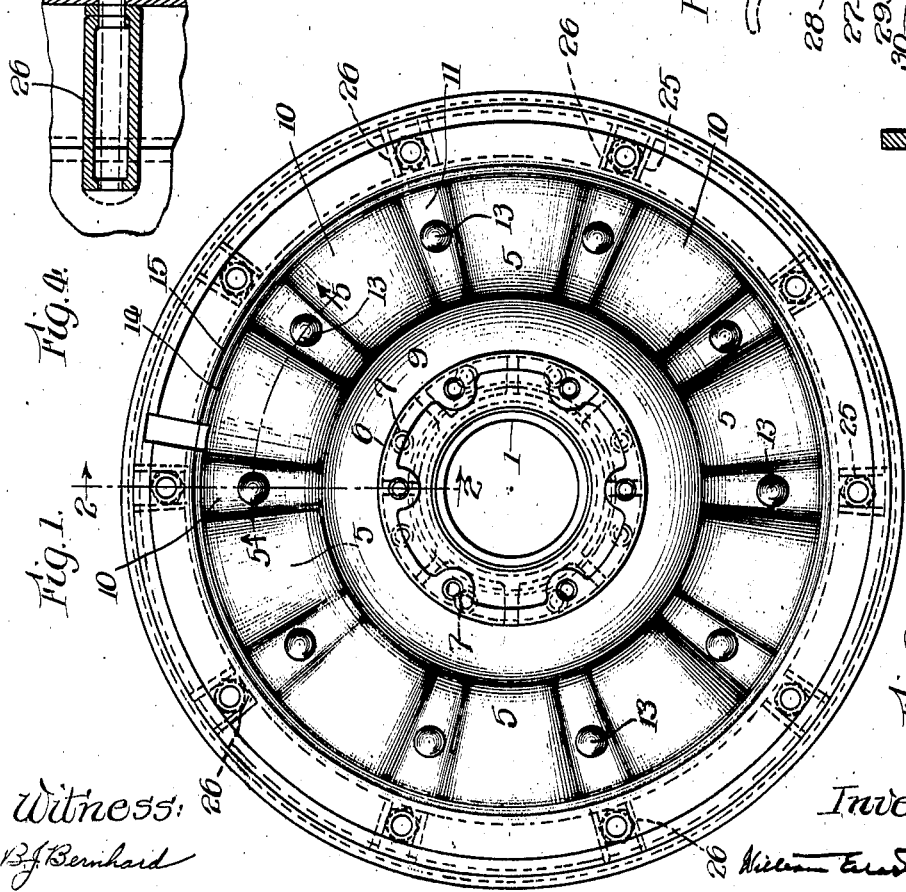
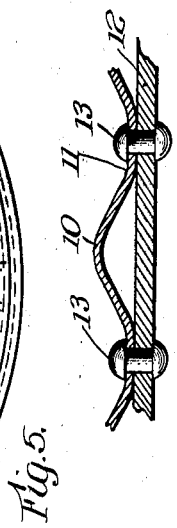
Witness:
B. J. Bernhard
Inventor:
William Evard Williams

UNITED STATES PATENT OFFICE.

WILLIAM ERASTUS WILLIAMS, OF CHICAGO, ILLINOIS.

PRESSED-PLATE WHEEL.

1,378,300.  Specification of Letters Patent.  Patented May 17, 1921.

Application filed November 10, 1919. Serial No. 336,813.

*To all whom it may concern:*

Be it known that I, WILLIAM ERASTUS WILLIAMS, a citizen of the United States, a resident of Chicago, in the county of Cook and State of Illinois, have invented a new and useful Improvement in Pressed-Plate Wheels, of which the following is a specification.

The object of my invention is to provide a cheap, strong, light disk wheel adapted to become the driving wheel of an automobile.

The invention is set forth in the claims.

Reference will be had to the accompanying drawings, in which:—

Figure 1 is a front elevation of the wheel.

Fig. 2 is a vertical section of one-half of the wheel.

Fig. 3 is a view similar to Fig. 2, showing a modified form.

Fig. 4 is a section on line 4—4 of Fig. 2.

Fig. 5 is a section on line 5—5 of Fig. 1.

Fig. 6 is a front view of the modified part shown in Fig. 3, but showing the modified part in dotted lines.

1 indicates the ordinary hub of an automobile truck wheel and 2 indicates the rim part of the standard automobile brake drum, more or less generally used.

However, with wooden and other types of wheels, the brake drum terminates in the region of the dotted line 3 and is here abutted against a hub flange of the wheel, but I prefer to make the brake drum a part of my wheel and extend down to and be pressed on to the hub with a very tight fit, and I provide for this juncture by an inturned annular flange 4, which is machined on the surface where it joins the hub, but sometimes pressed fits may be made without this machining. The main supporting web of my wheel I make out of a plate 5, which is secured to a flange 6 of the hub by rivets 7 or by any other suitable means.

This plate 5 has an internal annular flange 8 which furnishes additional bearing surface on the hub. The surface 9 of the wheel is smooth and curved as shown, but for stiffening purposes I press in a series of corrugations 10 along the central area between the hub and the rim. Opposite these corrugations the main web surface 11 abuts against the wall 12 of the brake drum and is secured thereto by rivets 13 or other suitable means.

The corrugations 10 and the wall 11 merge into an annular approximately horizontally inclined fixed rim flange 14. This flange 14 merges into the vertically inclined portion 15 which occupies the approximate position originally occupied by the wooden felly of the wooden wheel. This flange 15 is turned over into the annular fixed rim surface 16 and it is turned into the cylindrical surface 17, which merges into the inclined surface 18 and it terminates in a flat section 19.

The fixed rim of this wheel is arranged to take the ordinary demountable rim for a pneumatic tire, which is shown in dotted lines 21 and is provided with the bearing faces 22 and 23. The bearing surface 22 is engaged by a wedge clamping ring 20 and the latter bears on the inclined surface 16 of the fixed rim portion. The surface 23 of the rim is wedged in contact with the surface 18 of the fixed rim portion of the wheel when the rim is clamped on in substantially the same manner as is generally used with other types of wheels.

The clamping wedge ring 20 is held in engagement by a series of clamping blocks 24 clamped in place by a series of bolts 25, which arrangement is substantially what is found in some other types of wheels.

The fixed rim portion of my wheel with its bearing surfaces is supported from the annular flange portion 14 by a series of blocks 26 suitably shaped to fit snugly in between the flanges 14, 17. I prefer to make this block by bending a piece of iron as shown by the plan in Fig. 4, but other suitably shaped blocks may be used instead. These blocks 26 are held in place by the bolts 25 in the normal use of the bolt as a clamping member.

In place of the blocks 26 I may use the modified construction as shown in Figs. 3 and 6 and use a series of small blocks 27 which have projections 28 that abut against the end 19 of the fixed rim member of my wheel. The inner ends of these blocks 27 have flanges 29 that are secured by rivets 30 to the wall 2 of the brake drum, thus stiffening the flange 17 across to the brake drum direct instead of through the medium of the annular flange 14.

By the arrangement whereby I fit the brake drum to the hub of the wheel by means of the flange 4, an integral part of the brake drum itself, I get a better support and alinement for the brake drum than the general support obtained by the practice in connection with the wooden wheel.

The shape of my pressed plate 5 with its bracing curve 9 merging into the surface 11, and secured to the brake drum at its outer zone makes a very strong and stiff wheel and utilizes the metal of the brake drum in an economical way not heretofore obtained.

The corrugations 10 have rounded angles and merge gently into the smooth surfaces of adjacent regions where stiffening is not needed, the construction giving at low cost a very stiff and easily cleaned disk.

I may, if desired, arrange to use the block 26 and the blocks 27 jointly.

The arrangement of the flanges 14 and the flanges 17 connected by the vertical portion 15, forms a box section that simulates the margin of a wooden wheel and is a strong construction and gives a smooth surface for the outer portion of the fixed rim, which is easily kept clean.

What I claim is:—

1. In a plate wheel, a brake drum supported on the hub and held in this position by a plate web secured to the hub, extending in a bracing direction and connected to the outer zone of the brake drum whereby the drum and the web mutually strengthen each other and with the hub form the main supporting body of the wheel.

2. In a plate wheel a brake drum having its main disk portion extending directly to the hub barrel and thus forming one wall of the web of the wheel, with a plate forming the other wall connected to the hub asunder from the brake drum, connected to the brake drum disk in its outer zone and having a horizontally arranged annular fixed rim flange for supporting the load of the wheel.

3. In a plate wheel, a main plate having smooth curved surfaces in the region where it joins the hub and stiffened by corrugations in the middle zone between the fixed rim and the hub and provided with approximately horizontally arranged fixed rim flanges, with a brake drum member having its disk portion secured to the hub and connected to the body of the main plate at or near the outer margin of the disk of the brake drum.

4. The combination with a hub having secured thereto a main web plate laterally offset to form an annular rim channel concentric with the hub, of transverse blocks fitting and secured in said channel, and a brake drum disk mounted on the hub and having its outer portion rigidly connected to said web plate.

5. A main disk forming the web of the wheel and having a fixed rim flange turned thereon, in connection with a brake drum having its disk portion connected to the hub in order to form a part of the wheel web in combination with a member extending across from the fixed rim flange of the main plate to the brake drum direct.

6. A wheel having a plate forming the main web portion of the wheel with two approximately horizontally arranged flanged portions forming the fixed rim section of the wheel and with a series of blocks for supporting members between the inner and outer fixed rim flange portions of the wheel.

7. In a wheel of the class described, a main plate forming the main body of the wheel and provided with flanges turned on the margin forming the fixed rim portion of the wheel and the said plate smooth in its surface where it joins to the hub and provided with radially arranged stiffening corrugations in the middle zone between the fixed rim and the hub and the said corrugations merging into the smooth surface around the hub at one end and merging into the fixed rim section at the other end.

8. In a wheel of the class described, a fixed rim section formed by a horizontally arranged flange turned from a plate web in combination with a brake drum connected to the said web and with a series of blocks extending across from the fixed rim flange to the brake drum.

9. The combination with a hub, of a plate wheel-disk and a smaller brake drum disk, both having sleeve-like flanges fitting over the hub and the marginal region of the smaller disk being fixed to the larger disk, and independent means for fixing the larger disk to the hub.

10. In a wheel of the class described, a plate forming the main web portion of the wheel and having a box section formed in its margin for the fixed rim of the wheel, with a series of connecting blocks interposed between the walls of the box section and demountable fastenings secured to the box section.

Signed at Chicago, in the county of Cook and State of Illinois, this sixth day of October, 1919.

WILLIAM ERASTUS WILLIAMS.

Witnesses:
J. B. JEFFERSON,
B. J. BERNHARD.